United States Patent
Sato et al.

(10) Patent No.: US 7,193,818 B2
(45) Date of Patent: Mar. 20, 2007

(54) MAGNETIC HEAD DEVICE AND METHOD FOR MAKING THE SAME

(75) Inventors: Akihiro Sato, Niigata-ken (JP); Hidezi Satoh, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 330 days.

(21) Appl. No.: 10/932,720

(22) Filed: Sep. 2, 2004

(65) Prior Publication Data
US 2005/0030667 A1    Feb. 10, 2005

(30) Foreign Application Priority Data
Sep. 5, 2003 (JP) ............................ 2003-313399

(51) Int. Cl.
*G11B 5/60* (2006.01)
(52) U.S. Cl. .................................................. 360/234.6
(58) Field of Classification Search ...................... None
See application file for complete search history.

(56) References Cited

U.S. PATENT DOCUMENTS 5,696,652 A   12/1997   Satoh 6,775,101 B2 *   8/2004   Satoh et al. ............. 360/234.6
6,920,014 B2 *   7/2005   Sato et al. ............... 360/234.5

FOREIGN PATENT DOCUMENTS

JP        09-22518      1/1997
JP        2002-343048   11/2002

\* cited by examiner

*Primary Examiner*—Robert S. Tupper
(74) *Attorney, Agent, or Firm*—Brinks Hofer Gilson & Lione

(57) ABSTRACT

A magnetic head device includes a slider including a thin-film element for writing and/or reading and a support for supporting the slider, the slider being bonded to a joint surface of the support at least partially with a conductive resin. A method for making the magnetic head device includes the steps of (a) applying the conductive resin at least onto a portion of an insulating layer formed on the joint surface of the support, (b) bonding the slider to the joint surface of the support with the conductive resin, and (c) causing dielectric breakdown in the insulating layer lying under the conductive resin before step (b) at the latest.

3 Claims, 12 Drawing Sheets

MAGNETIC HEAD DEVICE AND METHOD FOR MAKING THE SAME

This application claims the benefit of priority to Japanese Patent Application No. 2003-313399 filed on Sep. 5, 2003, herein incorporated by reference.

BACKGROUND OF THE INVENTION

1. Field of the Invention

The present invention relates to a magnetic head device which is to be mounted in a hard disk drive or the like. More particularly, the invention relates to a magnetic head device in which a good electrical connection between a slider and its support is ensured and electrostatic discharge is prevented from occurring in a thin-film element for writing and/or reading provided on the slider and to a method for making the magnetic head device.

2. Description of the Related Art

A conventional magnetic head device which is to be mounted in a hard disk drive or the like has, for example, a structure shown in FIG. 21.

The magnetic head device includes a slider 1 and a support 2 for supporting the slider 1.

The slider 1 is composed of a ceramic or the like. As shown in FIG. 21, a thin-film element 3 for writing and/or reading is provided on the trailing side of the slider 1.

The support 2 includes a load beam 4 and a flexure 5. The load beam 4 is composed of a leaf spring material, such as stainless steel, and includes bent sections 4a having rigidity on both sides of the front end. A predetermined elastic force can be displayed at the base end of the load beam 4 (not shown in the drawing).

As shown in FIG. 21, a pivot 6 protruding toward the flexure 5 is disposed in the front portion of the load beam 4, and the slider 1 abuts against the pivot 6 with the flexure 5 therebetween.

The flexure 5, for example, includes a fixed section 5a and a tongue 5b. The fixed section 5a and the tongue 5b are joined to each other at the trailing end. The tongue 5b is separated from the fixed section 5a except at the joint to the fixed section 5a, and the leading side of the tongue 5b is a free end. The fixed section 5a is bonded to the rear face of the load beam 4 with an adhesive or the like. The tongue 5b is disposed so as to be movable under the pivot 6, and the slider 1 is bonded to the rear face of the tongue 5b with an adhesive layer 8.

The adhesive layer 8 disposed between the tongue 5b and the slider 1 is, for example, composed of a thermosetting adhesive, a conductive resin, etc.

The conductive resin is disposed between the tongue 5b and the slider 1 in order to dissipate static electricity charged in the slider 1 due to friction, etc., toward the support 2.

FIG. 22 is a partially enlarged sectional view showing the slider 1 before being bonded to the tongue 5b.

As shown in FIG. 22, a conductive resin 9 is partially applied onto the tongue 5b and a thermosetting resin (not shown in the drawing) is also applied onto the tongue 5b, and then the slider 1 is placed on the tongue 5b. By subsequent heating, etc., the slider 1 is bonded to the tongue 5b.

As shown in FIG. 22, an insulating layer 10, which is formed due to natural oxidation or the like, is disposed on the tongue 5b. Accordingly, the conductive resin 9 is applied onto the insulating layer 10.

The conductive resin is described, for example, in Japanese Unexamined Patent Application Publication No. 9-22518 (Patent Literature 1) and Japanese Unexamined Patent Application Publication No. 2002-343048 (Patent Literature 2).

According the experiments, which will be described below, when a low voltage, for example, 0.5 V or less, is applied between the slider 1 and the support 2, the resistance is significantly high at several megohms. That is, the electrical connection between the slider 1 and the support 2 is extremely poor.

The reason for this is that the insulating layer 10 is disposed on the tongue 5b. Consequently, even if the conductive resin 9 is placed between the tongue 5b and the slider 1, a good electrical connection is not achieved between the slider 1 and the tongue 5b, and static electricity charged in the slider 1 cannot be effectively dissipated toward the support 2.

As a result, as shown in FIG. 21, when the slider 1 flies above a recording medium D with a short spacing from the surface of the recording medium D and if an electrical potential difference occurs between the slider 1 and the recording medium D, a discharge occurs from the slider 1 to the recording medium D, i.e., a short circuit occurs between the slider 1 and the recording medium D. Thereby, an overcurrent flows through the thin-film element 3, resulting in electrostatic discharge (ESD) of the thin-film element 3.

Although Patent Literatures 1 and 2 describe the conductive resin, neither of them describes the insulating layer formed under the conductive resin. Therefore, it has not been disclosed how to secure an electrical connection between the slider 1 and the tongue 5b through the conductive resin 9 and the insulating layer 10.

SUMMARY OF THE INVENTION

The present invention has been achieved to overcome the problems described above. It is an object of the present invention to provide a magnetic head device in which a good electrical connection is ensured between a slider and its support and electrostatic discharge is suppressed in a thin-film element for writing and/or reading provided on the slider and a method for making the magnetic head device.

In an aspect of the present invention, a magnetic head device includes a slider including a thin-film element for writing and/or reading and a support for supporting the slider, the slider being bonded to a joint surface of the support at least partially with a conductive resin. An insulating layer is disposed on the joint surface of the support, the insulating layer having at least a region in which dielectric breakdown is caused, and the conductive resin is disposed on the region in which dielectric breakdown is caused.

As described above, in the present invention, the insulating layer, which is disposed on the joint surface of the support, includes at least a region in which dielectric breakdown is caused, and the conductive resin is disposed on the region in which dielectric breakdown is caused.

Consequently, a good electrical connection is maintained between the conductive resin and the support, and the electrical connection between the support and the slider is improved. Therefore, it is possible to provide a magnetic head device in which electrostatic discharge (ESD) is effectively suppressed in the thin-film element compared to the conventional magnetic head device.

In the present invention, the conductive resin may include a resin and a conductive filler mixed with the resin. In such a case, dielectric breakdown occurs between conductive filler particles. Consequently, the electrical connection between the slider and the support can be more effectively improved through the conductive resin and the region of the insulating layer in which dielectric breakdown is caused.

In the present invention, preferably, the resistance between the slider and the support is 100 Ω or less when a voltage of 0.5 V or less is applied.

In another aspect of the present invention, in a method for making a magnetic head device including a slider provided with a thin-film element for writing and/or reading and a support for supporting the slider, the slider being bonded to a joint surface of the support at least partially with a conductive resin, the method includes the steps of:
(a) applying the conductive resin at least onto a portion of an insulating layer formed on the joint surface of the support;
(b) bonding the slider to the joint surface of the support with the conductive resin; and
(c) causing dielectric breakdown in the insulating layer lying under the conductive resin before step (b) at the latest.

In the present invention, since dielectric breakdown is caused in the insulating layer lying under the conductive resin in step (c), a good electrical connection between the conductive resin and the support is ensured, and the electrical connection between the slider and the support can be improved compared to the conventional technique.

In the present invention, since dielectric breakdown is caused before step (b) of bonding the slider to the support, the step of causing the dielectric breakdown does not affect the thin-film element provided on the slider, and writing and/or reading characteristics of the thin-film element can be maintained satisfactorily.

In the present invention, preferably, after the conductive resin is applied in step (a), a voltage is applied to the insulating layer lying under the conductive resin to cause dielectric breakdown in the insulating layer in step (c). In the present invention, dielectric breakdown can be caused in the insulating layer by such a simple process. In particular, by the method described above, since dielectric breakdown is caused in the insulating layer lying under the conductive resin by the application of the voltage before the slider is bonded to the support, a problem (i.e., degradation in characteristics) in the thin-film element, which is anticipated to occur if a voltage is applied after the slider is bonded to the support, does not occur.

More specifically, preferably, an apparatus which is capable of both applying the conductive resin and applying the voltage is used, and after the conductive resin is applied by a nozzle of the apparatus, the voltage is applied to the insulating layer with the nozzle being pressed against the surface of the insulating layer lying under the conductive resin. In such a process, since the same apparatus can be used in the step of applying the conductive resin and the step of applying the voltage, the manufacturing time can be shortened and the manufacturing process can be simplified.

In the present invention, after the conductive resin is applied, the voltage may be applied to the insulating layer through the conductive resin using an apparatus capable of applying the voltage. In such a case, when the conductive resin includes a resin and a conductive filler mixed with the resin, dielectric breakdown can be caused more reliably between conductive filler particles by the application of the voltage.

In the method in which a voltage is applied to the insulating layer through the conductive resin, preferably the conductive resin is subjected to a drying step before the application of the voltage.

Alternatively, step (c) may be carried out before step (a) so that dielectric breakdown is caused in a region of the insulating layer, and then step (a) is carried out so that the conductive resin is applied on the region in which dielectric breakdown. In such a case, preferably, dielectric breakdown is caused in the region of the insulating layer by applying a voltage to the insulating layer.

Additionally, preferably, an adhesive which is different from the conductive resin is further applied to the insulating layer in step (c), and then the slider is bonded to the joint surface in view of improvement in the bonding strength between the slider and the support.

In accordance with the present invention, since dielectric breakdown is caused in the insulating layer lying under the conductive resin, a good electrical connection can be achieved between the conductive resin and the support, and thereby the electrical connection between the support and the slider can be improved. Therefore, it is possible to provide a magnetic head device in which electrostatic discharge (ESD) can be effectively suppressed in the thin-film element compared to the conventional technique.

In accordance with the present invention, dielectric breakdown can be caused by a very simple process, and dielectric breakdown is caused in the insulating layer lying under the conductive resin layer before the slider is bonded to the support. Consequently, a problem (i.e., degradation in characteristics) in the thin-film element, which is anticipated to occur if dielectric breakdown is caused after the slider is bonded to the support, does not occur.

DESCRIPTION OF THE PREFERRED EMBODIMENTS

Figure 1:
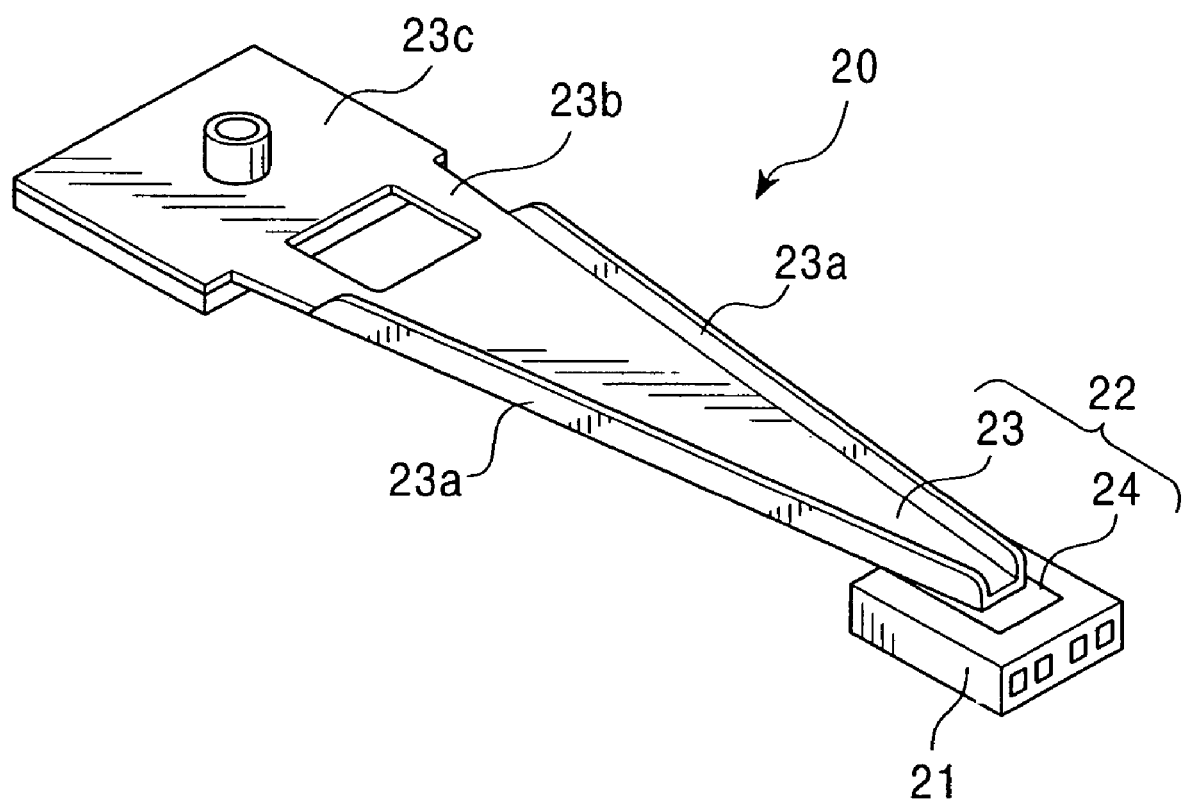
FIG. 1 is a partial perspective view of a magnetic head device of the present invention.
Figure 2:
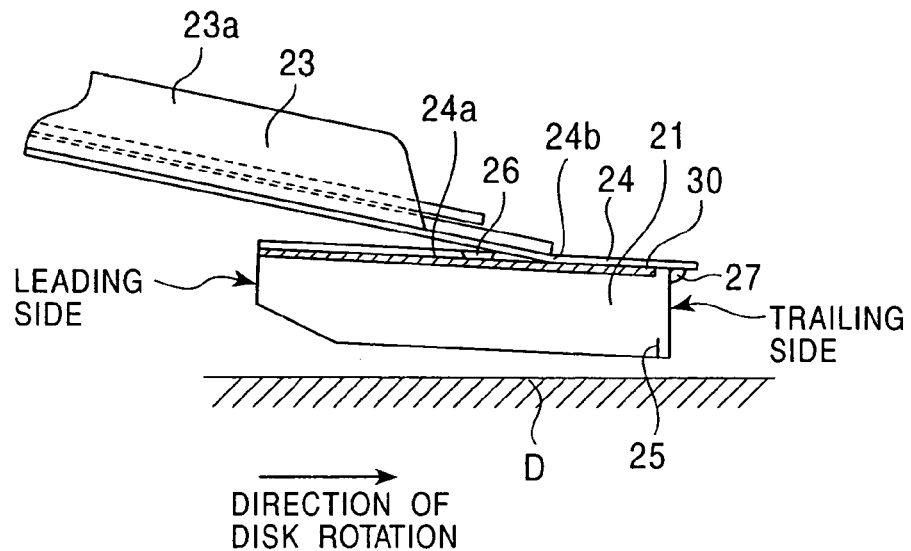
FIG. 2 is a partially enlarged side view of a tip region of the magnetic head device shown in FIG. 1.

FIG. 1 is a partial perspective view showing an overall structure of a magnetic head device in an embodiment of the present invention. FIG. 2 is a partially enlarged side view of a tip region of the magnetic head device shown in FIG. 1.

As shown in FIG. 1, a magnetic head device 20 includes a slider 21 and a support 22 for supporting the slider 21.

The support 22 includes a load beam 23 composed of a leaf spring material, such as stainless steel, and a flexure 24 composed of a leaf spring material, such as stainless steel, the flexure being provided on the tip of the load beam 23.

As shown in FIG. 1, the load beam 23 includes bent sections 23a having rigidity on both sides. A predetermined elastic force can be presented at a base 23b, which does not have the bent sections, of the load beam 23. A mounting region 23c is provided on the base 23b. The mounting region 23c is mounted on a mounting face of a given disk drive so that the magnetic head device 20 is mounted in the disk drive.

The slider 21 is composed of a ceramic, such as alumina-titanium carbide ($Al_2O_3$—TiC).

As shown in FIG. 2, a thin-film element 25 is provided on the trailing side of the slider 21, the thin-film element 25 including, for example, a thin-film read element using a magnetoresistance effect, i.e., a magnetic read section, and an inductive thin-film write element, i.e., a magnetic write section. The thin-film element 25 may include only a thin-film read element or a thin-film write element.

Figure 3:
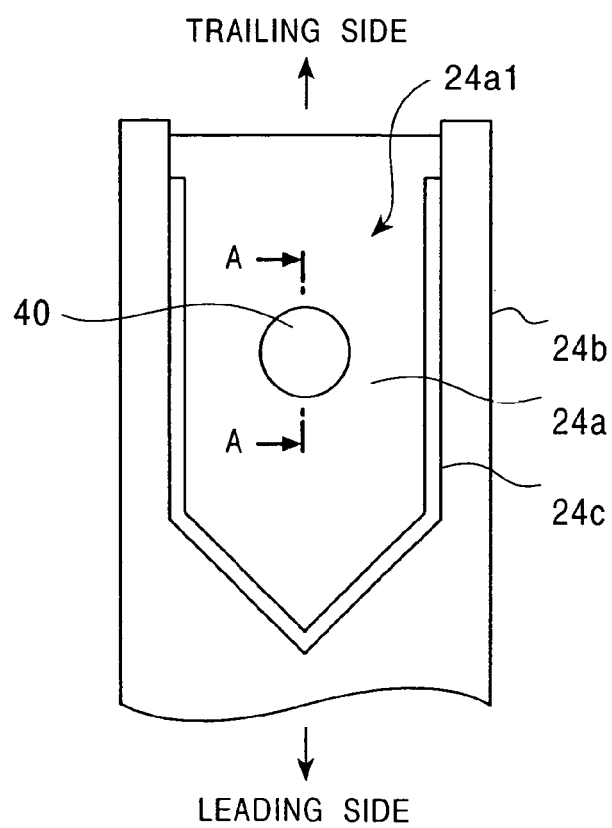
FIG. 3 is a partial plan view of a surface of a flexure to be bonded to a slider.

The flexure 24 includes a tongue 24a and a fixed section 24b. As shown in FIG. 3, which is a partial plan view of a surface of the flexure 24 to be bonded to the slider 21, the tongue 24a is connected to the fixed section 24b on the trailing end. The tongue 24a includes a cut-out section 24c on the edges and the leading end and is separated from the fixed section 24b. The leading end of the tongue 24a is thus a free end.

As shown in FIG. 2, the fixed section 24b is bonded to the lower surface of the load beam 23, while the tongue 24a abuts against a pivot 26 protruding downward from the load beam 23 and is allowed to move freely. The slider 21 is bonded to the lower surface (joint surface) of the tongue 24a and can move in the pitch and roll direction with the pivot 26 serving as a fulcrum.

Electrode terminals (not shown in the drawing) led from the thin-film element 25 are disposed on the trailing edge of the slider 21. A conductive pattern (not shown in the drawing) extending from the load beam 23 is placed on the lower surface of the tongue 24a so as to face the electrode terminals. The electrode terminals and the conductive pattern are bonded to each other by a connecting member 27, for example, ball bonding composed of gold (Au).

The magnetic head device 20 shown in FIGS. 1 and 2 is used in, for example, a "CSS" (Contact Start Stop) type hard disk drive. In the CSS type, first, the slider 21 is gently pressed to the recording surface of the recording medium D by a weak elastic force of the support 22. That is, before the rotation of the recording medium D is started, the slider 21 is in contact with the recording medium D. When the recording medium D starts rotating, because of a lifting force caused by the airflow on the surface of the recording medium D, the leading side of the slider 21 is lifted higher from the surface of the recording medium D compared with the trailing side which is lifted slightly from the surface of the recording medium D. The slider 21 scans the surface of the recording medium D in such an inclined manner.

As shown in FIG. 2, the slider 21 is bonded to the lower surface (joint surface) of the tongue 24a of the flexure 24 with an adhesive layer 30.

In the embodiment shown in FIG. 2, the adhesive layer 30 contains at least a conductive resin.

A first bonding method for bonding between the slider 21 and the tongue 24a of the flexure 24 will be described below with reference to FIGS. 3 to 7 and FIG. 13.

After the load beam 23 and the flexure 24 are aligned and bonded to each other, as shown in FIG. 3, a conductive resin 40 is partially applied onto a surface 24a1 (to be bonded to the slider) of the tongue 24a of the flexure 24. The conductive resin 40 may be applied to any location. Since the surface 24a1 is a planarized surface, the conductive resin 40 can be applied to a large area of the surface 24a1.

In FIG. 3, the conductive resin 40 is applied only to the central area of the surface 24a1.

The conductive resin 40 may include a thermosetting binder resin, such as an epoxy, phenol, or urethane resin, and a conductive filler composed of silver, copper, or gold mixed with the resin; or may include a thermoplastic binder resin, such as an acrylic, polyurethane, polyester, or nylon resin, and the conductive filler mixed with the resin.

In the application of the conductive resin 40, an apparatus which is capable of both applying the conductive resin 40 and applying a voltage, which will be described below, is used.

Figure 4:
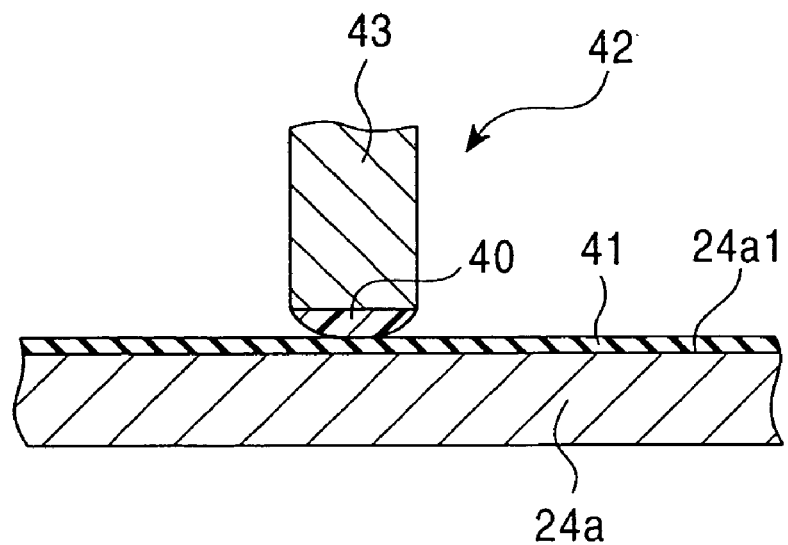
FIG. 4 is a partially enlarged sectional view showing a nozzle and a tongue in a first bonding method.

FIG. 4 is a partially enlarged sectional view taken along the line A—A of FIG. 3. As shown in FIG. 4, the conductive resin 40 is applied from the tip of a nozzle 43 of an apparatus 42 onto the surface 24a1.

As shown in FIG. 4, an insulating layer 41, which is formed due to natural oxidation or the like, is disposed on the surface 24a1 of the tongue 24a. The reason for this is that, unlike the load beam 23, it is difficult to protect the flexure 24 from oxidation or the like by gripping with a fixing member or by any other means during the manufacture. The flexure 24, which is composed of an extremely thin leaf spring, is easily damaged or bent. Such a problem should be avoided since the flexure 24 is subsequently bonded to the slider 21. Consequently, the flexure 24 is in a state in which the insulating layer 41 is easily formed due to natural oxidation or the like. The insulating layer 41 has a thickness of about 100 Å. Additionally, the insulating layer 41 may be intentionally formed.

As shown in FIG. 4, the conductive resin 40 is partially applied onto the insulating layer 41.

Figure 5:
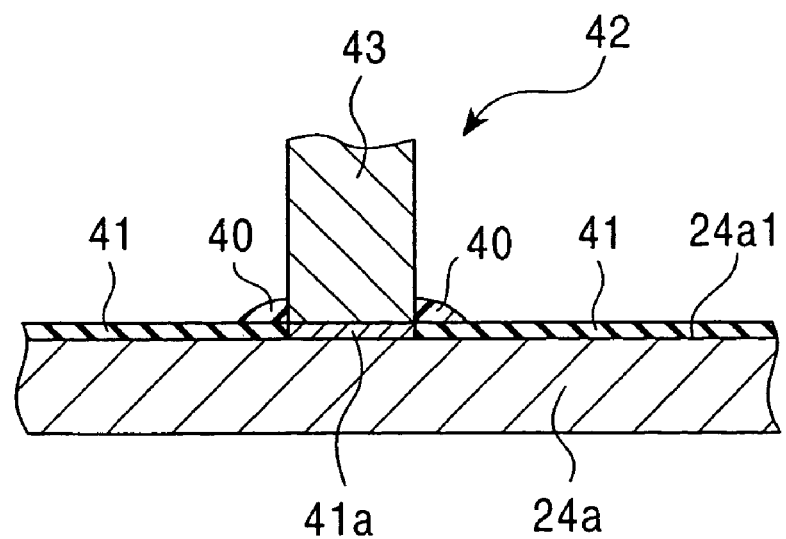
FIG. 5 is a partially enlarged sectional view showing a step subsequent to the step shown in FIG. 4.

Next, as shown in FIG. 5, the nozzle 43 is pressed down to the surface of the insulating layer 41 under the conductive resin 40. Thereby, the conductive resin 40 is squashed and spread around the nozzle 43.

Figure 6:
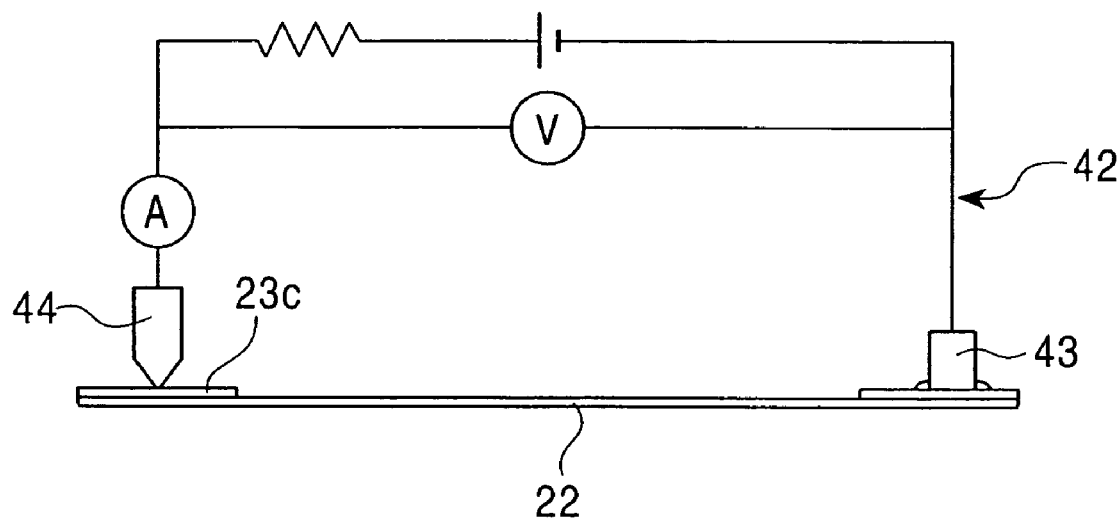
FIG. 6 is a reduced diagram showing the same step as that shown in FIG. 5, including a partial side view of a voltage applying apparatus and a support and a circuit diagram.

In the subsequent step, dielectric breakdown is caused in the insulating layer 41 lying under the nozzle 43. Specifically, as shown in FIGS. 5 and 6, while the nozzle 43 (for example, functioning as an output terminal) is pressed against the surface of the insulating layer 41, another terminal 44 (for example, an input terminal) of the apparatus 42 is allowed to abut against a region (for example, the mounting region 23c of the load beam 23) of the support 22.

As described above, the apparatus 42 is also capable of applying a voltage, and therefore, the nozzle 43 functions as a terminal for applying the voltage as well as a port for applying the conductive resin 40.

The insulating layer is not disposed on the mounting region 23c, against which the tip of the terminal 44 abuts. (Alternatively, even if the insulating layer is disposed, the insulating layer is excessively thin, and insulating properties are not substantially displayed due to pinholes, etc.) Therefore, an electrical connection is satisfactorily ensured between the terminal 44 and the mounting region 23c. In the circuit shown in FIG. 6, the support 22 corresponds to the ground.

A voltage, for example, about 4 V (a current of about 100 mA), is generated between the nozzle 43 and the terminal 44. When such a voltage is applied to the insulating layer 41, dielectric breakdown occurs at least in a region 41a of the insulating layer 41 under the nozzle 43 (refer to FIG. 5).

In the region 41a in which dielectric breakdown is caused, cracking, melting, or influx of the conductive filler contained in the conductive resin 40 is assumed to have occurred.

Figure 7:
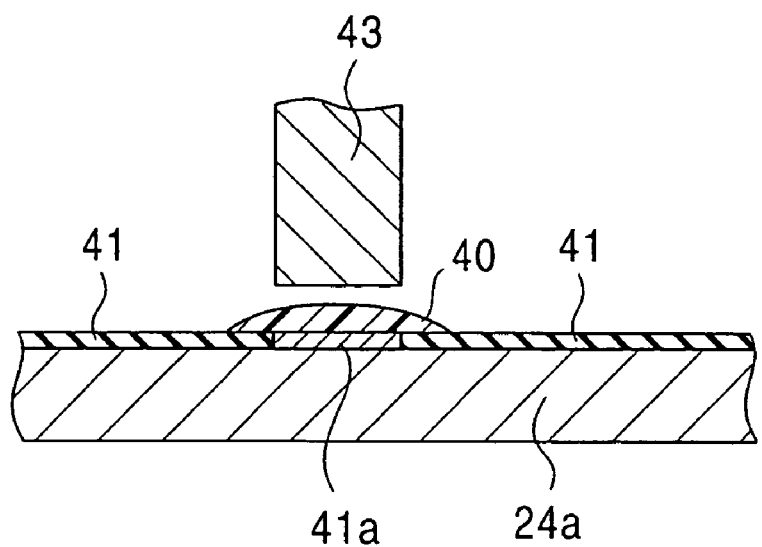
FIG. 7 is a partially enlarged sectional view showing a step subsequent to the step shown in FIGS. 5 and 6.

The nozzle 43 is then detached from the surface of the insulating layer 41. Since the conductive resin 40 is not hardened at this stage, the conductive resin 40 spread around the nozzle 43 sticks together when the nozzle 43 is detached. As shown in FIG. 7, the conductive resin 40 eventually covers the region 41a in which dielectric breakdown is caused.

Figure 13:
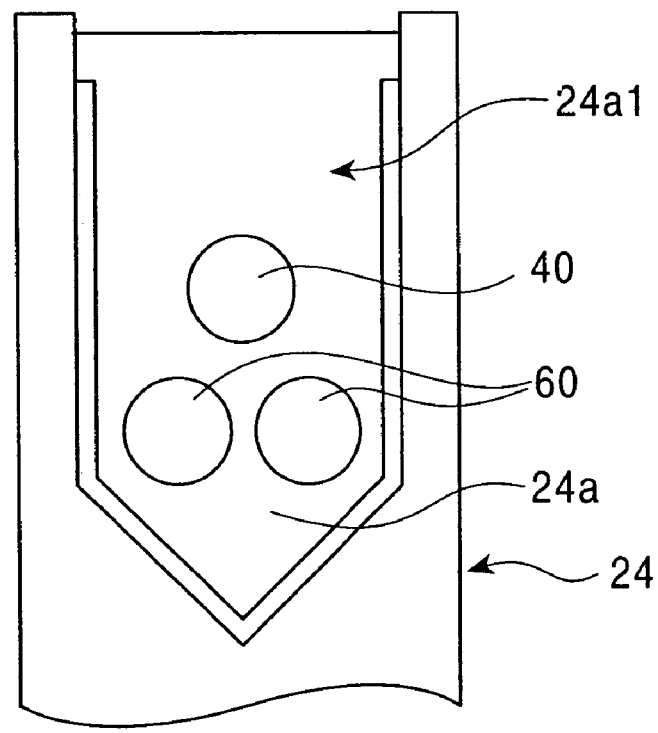
FIG. 13 is a partial plan view of a surface of a flexure to be bonded to a slider in a step subsequent to the step shown in FIG. 7, 10, or 12.

In the subsequent step shown in FIG. 13, an adhesive 60, such as a thermosetting adhesive or UV curing adhesive, which is different from the conductive resin 40 is applied onto the surface 24a1 of the tongue 24a of the flexure 24. The adhesive 60 can be applied onto any region on the surface 24a1.

The slider 21 is aligned with and placed on the surface 24a1, and the slider 21 is bonded to the surface 24a1 by heating or ultraviolet irradiation.

A second bonding method for bonding between the slider 21 and the tongue 24a of the flexure 24 will be described below with reference to FIGS. 8 to 10 and FIG. 13. In the second bonding method, application of the conductive resin 40 and application of the voltage are performed with different apparatuses.

Figure 8:
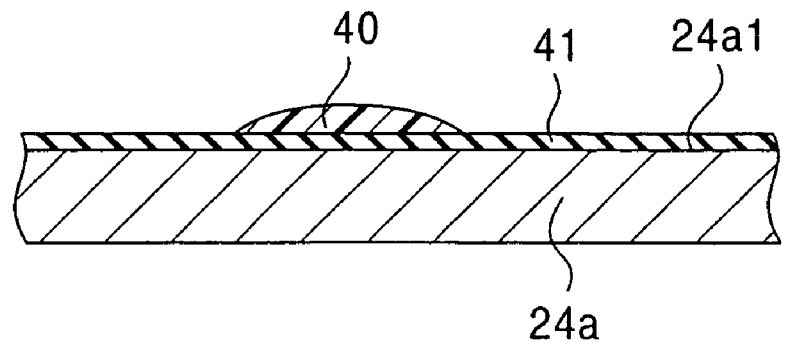
FIG. 8 is a partially enlarged sectional view showing a tongue in a second bonding method.

In the step shown in FIG. 8, using a coating apparatus not shown in the drawing, a conductive resin 40 is partially applied onto the surface 24a1 of the tongue 24a of the flexure 24. As shown in FIG. 8, since the insulating layer 41, which is formed due to natural oxidation or the like, is disposed on the surface 24a1, more precisely, the conductive resin 40 is partially applied onto the insulating layer 41.

Next, the surface of the conductive resin is slightly hardened by drying. The drying step is performed by air blowing or low-temperature heating. If heating is performed at high temperatures and for a long period of time, the entire conductive resin 40 is hardened. Consequently, heating is performed at low temperatures and for a short period of time so that only the surface of the conductive resin 40 is slightly hardened.

In the subsequent step, dielectric breakdown is caused in the insulating layer 41 lying under the conductive resin 40.

Figure 9:
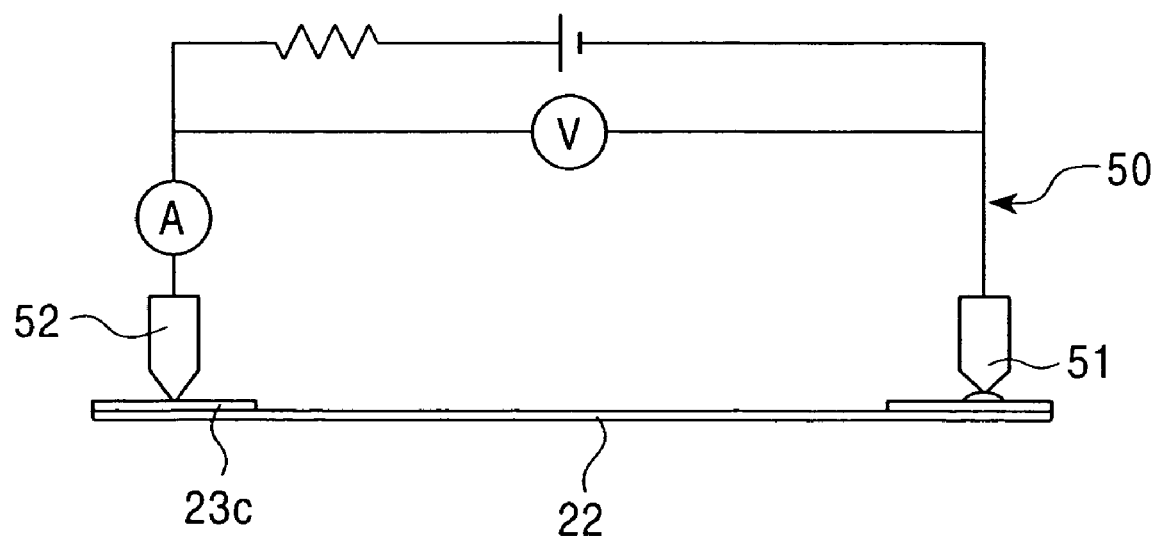
FIG. 9 is a diagram showing a step performed subsequent to the step shown in FIG. 8, including a partial side view of a voltage applying apparatus and a support and a circuit diagram.

Specifically, as shown in FIGS. 8 and 9, a first terminal (for example, an output terminal) 51 of a voltage applying apparatus (breakdown voltage measuring apparatus) 50 is allowed to abut against the conductive resin 40, and a second terminal (for example, an input terminal) 52 is allowed to abut against a region (for example, the mounting region 23c of the load beam 23) of the support 22.

Figure 10:
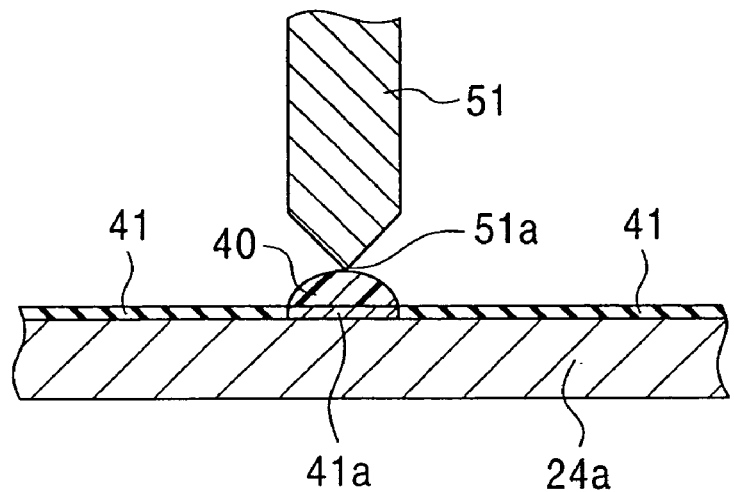
FIG. 10 is a partially enlarged sectional view of FIG. 9.

Herein, as shown in FIG. 10, a tip 51a of the first terminal 51 is allowed to abut against the conductive resin 40. Since the surface of the conductive resin 40 is slightly hardened, the conductive resin 40 does not adhere to the tip 51a of the first terminal 51. Therefore, when many supports 22, each including the tongue 24a coated with the conductive resin 40, are arranged for one production line and a voltage is applied to the individual portions of the conductive resin 40 one after another, it is not necessary to wipe the conductive resin 40 attached to the tip 51a of the first terminal 51 each time. Thereby, it is possible to efficiently apply the voltage to the individual portions of the conductive resin 40 on the multiple supports 22 at short intervals.

A voltage, for example, about 4 V (a current of about 100 mA), is generated between the terminals 51 and 52. When such a voltage is applied between the conductive resin 40 and the support 22, a short circuit occurs between the conductive resin 40 and the tongue 24a therebeneath through the insulating layer 41, and dielectric breakdown occurs in a region 41a of the insulating layer 41 sandwiched between the conductive resin 40 and the tongue 24a (refer to FIG. 10).

In the region 41a in which dielectric breakdown is caused, cracking, melting, or influx of the conductive filler contained in the conductive resin 40 is assumed to have occurred.

In the conductive resin 40, for example, a conductive filler is mixed with a resin. Depending on the type of the conductive resin 40, there may be a case in which a good electrical connection is not achieved when the conductive resin 40 is applied.

Consequently, as shown in FIGS. 9 and 10, if a voltage is applied between the conductive resin 40 and the support 22, dielectric breakdown is caused in the insulating layer 41 and dielectric breakdown is also properly caused between conductive filler particles in the conductive resin 40, and thus the electrical connection of the conductive resin 40 is believed to be improved. However, if the conductive resin 40 originally has a good electrical connection, it is not necessary to apply a voltage to the conductive resin 40. In such a case, the slider 21 and the support 22 can be bonded more simply by the first bonding method.

In the subsequent step shown in FIG. 13, an adhesive 60, such as a thermosetting adhesive or UV curing adhesive, which is different from the conductive resin 40 is applied onto the surface 24a1 of the tongue 24a of the flexure 24. The adhesive 60 can be applied onto any region on the surface 24a1. The slider 21 is aligned with and placed on the surface 24a1, and the slider 21 is bonded to the surface 24a1 by heating or ultraviolet irradiation.

A third bonding method for bonding between the slider 21 and the tongue 24a of the flexure 24 will be described below with reference to FIGS. 11 to 13.

Figure 11:
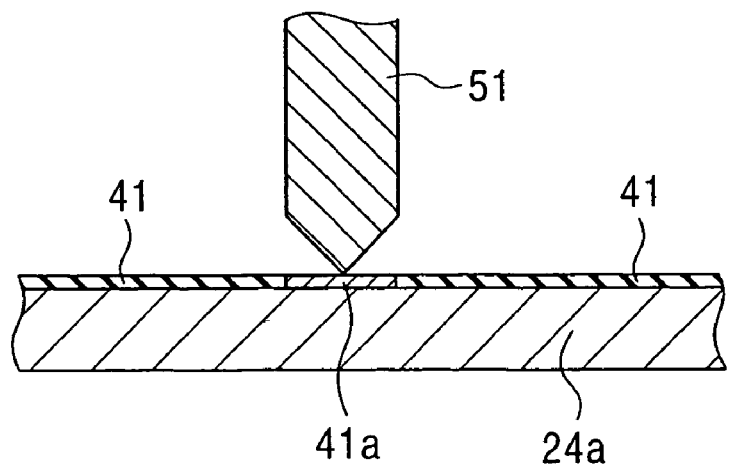
FIG. 11 is a partially enlarged sectional view showing a tongue and a terminal of a voltage applying apparatus in a third bonding method.

In the step shown in FIG. 11, dielectric breakdown is caused in a region 41a of the insulating layer 41 disposed on the surface 24a1 of the flexure 24. In order to cause dielectric breakdown, for example, using the apparatus 50 shown in FIG. 9, the first terminal 51 of the apparatus 50 is allowed to abut against the surface of the insulating layer 41 and a voltage, for example, about 4 V, is applied to the insulating layer 41. Thereby, dielectric breakdown occurs in a region 41a of the insulating layer 41 to which the voltage has been applied.

Figure 12:
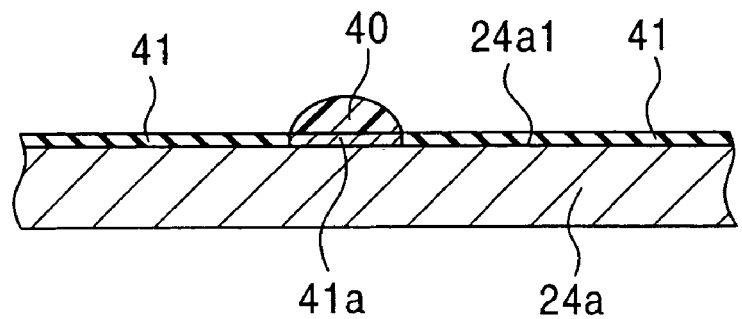
FIG. 12 is a partially enlarged sectional view of the tongue in a step subsequent to the step shown in FIG. 11.

In the subsequent step shown in FIG. 12, the conductive resin 40 is applied onto the region 41a in which dielectric breakdown is caused.

In the subsequent step shown in FIG. 13, an adhesive 60, such as a thermosetting adhesive or UV curing adhesive, which is different from the conductive resin 40 is applied onto the surface 24a1 of the tongue 24a of the flexure 24. The adhesive 60 can be applied onto any region on the surface 24a1. The slider 21 is aligned with and placed on the surface 24a1, and the slider 21 is bonded to the surface 24a1 by heating or ultraviolet irradiation.

In the step shown in FIG. 11, instead of using the apparatus 50 (shown in FIG. 9) which is only capable of applying the voltage, the apparatus 42 (shown in FIG. 6) which is capable of both applying the conductive resin 40 and applying the voltage may be used. In such a case, in the step shown in FIG. 11, after a voltage is applied by the apparatus 42, the nozzle 43 of the apparatus 42 is detached from the surface so as to be placed slightly above the region 41a in which dielectric breakdown is caused and then the conductive resin 40 is applied onto the region 41a. Use of the apparatus 42 shown is FIG. 6 is preferable because application of the voltage and application of the conductive resin 40 can be performed by the same apparatus and the conductive resin 40 can be reliably applied onto the region 41a in which dielectric breakdown is caused by the application of the voltage.

The three manufacture methods described above are commonly characterized in that before the slider 21 is bonded to the support 22, by applying a voltage between the conductive resin 40, which is applied on the surface 24a1 of the tongue 24a of the flexure 24 constituting the support 22, and the tongue 24a, dielectric breakdown is caused in the insulating layer 41 lying between the conductive resin 40 and the tongue 24a. That is, application of the voltage is not performed after the slider 21 is bonded to the support 22. Consequently, it is possible to avoid problems, such as degradation in characteristics, in the thin-film element 25 provided on the slider 21 due to the application of the voltage.

The manufacture method of the present invention is secondly characterized in that dielectric breakdown can be partially caused in the insulating layer 41 at a region lying under the conductive resin 40. In the present invention, dielectric breakdown may be caused in the entire insulating layer 41 disposed on the surface 24a1, or may be caused partially in the insulating layer 41 lying under the conductive resin 40. As a result, the insulating layer 41 other than the region lying under the conductive resin 40 is allowed to function as a highly insulating layer, and insulating properties are ensured between the slider 21 and the flexure 24 at the region other than the region lying under the conductive resin 40. Thereby, it is possible to prevent a short circuit from occurring at an unexpected location between the slider 21 and the flexure 24.

The manufacture method of the present invention is thirdly characterized in that dielectric breakdown can be caused in the insulating layer 41 lying under the conductive resin 40 by an extremely simple process. In the manufacture method described above, dielectric breakdown is caused in the insulating layer 41 simply by applying a voltage to the insulating layer 41.

In the first bonding method described above mainly with reference to FIGS. 4 to 7, since application of the conductive resin 40 and application of the voltage can by performed by the same apparatus 42, the manufacturing process can be simplified and the manufacturing time can be shortened.

If application of the conductive resin 40 and application of the voltage are performed with the same apparatus 42, unlike the second bonding method in which application of the conductive resin 40 and application of the voltage are performed by different apparatuses (mainly refer to FIGS. 8 to 10), it is not necessary to preliminarily harden the surface of the conductive resin 40, and the manufacturing process can be extremely simplified.

In the second bonding method described above mainly with reference to FIGS. 8 to 10, in particular, when the conductive resin 40 does not have a good electrical connection at the stage of coating, dielectric breakdown is effectively caused also in the conductive resin 40. Thereby, a more satisfactory electrical connection can be achieved in the conductive resin 40 itself. In particular, when a resin with which a conductive filler is mixed is used as the conductive resin 40, dielectric breakdown can be effectively caused between conductive filler particles by the application of the voltage. Thereby, the electrical connection of the conductive resin 40 itself can be improved.

Figure 14:
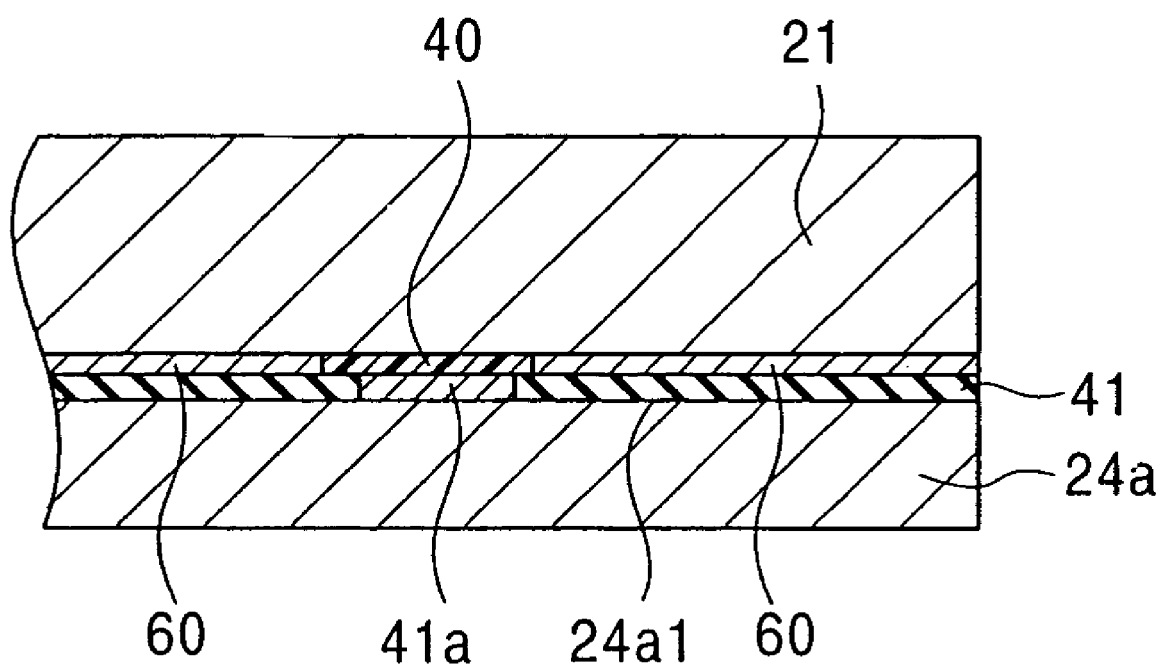
FIG. 14 is a partially enlarged sectional view of a tongue of a flexure and a slider in a magnetic head device of the present invention.

In the magnetic head device 20 manufactured by any one of the methods described above, the insulating layer 41 is disposed on the surface of the surface 24a1 of the tongue 24a, and the insulating layer 41 includes at least the region 41a in which dielectric breakdown is caused. The conductive resin 40 is disposed on the region 41a in which dielectric breakdown is caused (refer to FIG. 14).

Since the conductive resin 40 is disposed on the region 41a in which dielectric breakdown is caused, a good electrical connection is maintained between the conductive resin 40 and the tongue 24a, and the electrical connection between the tongue 24a and the slider 21 is improved. Static electricity charged in the slider 21 can be easily dissipated toward the support 22 through the conductive resin 40 and the region 41a in which dielectric breakdown is caused. Thereby, it is possible to provide the magnetic head device 20 in which electrostatic discharge (ESD) is suppressed compared to the conventional magnetic head device.

In the present invention, the material, internal structure, etc., of the conductive resin 40 are not particularly limited as long as an electrical connection is shown. In particular, when the conductive resin 40 includes a resin and a conductive filler mixed with the resin and the electrical connection of the conductive resin 40 is not very satisfactory at the coating stage, by employing the second bonding method, dielectric breakdown can also be caused between conductive filler particles and the electrical connection of the conductive resin 40 itself can be more effectively improved.

According to the experimental results described below, it is possible to set the resistance at 100 Ω or less when a voltage of 0.5 V or less is applied between the slider 21 and the support 22. The resistance of 100 Ω or less is dramatically low compared with the conventional examples (Comparative Examples) in which dielectric breakdown is not caused in the insulating layer 41 lying under the conductive resin 40. Even at a low voltage of 0.5 V or less, an electrical connection is properly achieved between the slider 21 and the support 22. During the actual use, in the magnetic head device 20 of the present invention, even if an electrical potential difference occurs between the slider 21 and the recoding medium D, charges can be effectively dissipated from the slider 21 through the conductive resin 40 toward the support 22, and it is possible to effectively prevent electrostatic discharge from occurring in the thin-film element 25.

EXAMPLES

Figure 15:
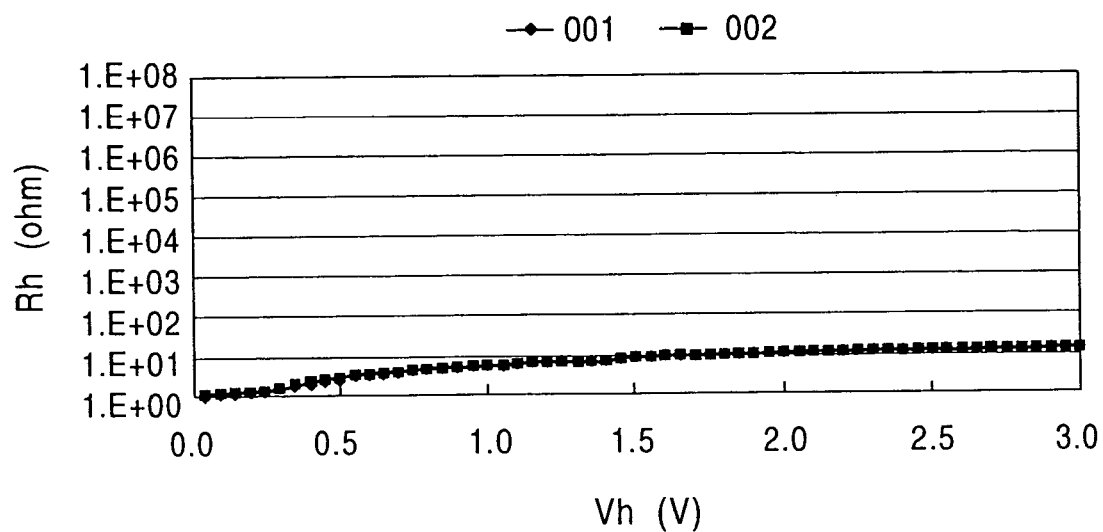
FIG. 15 is a graph showing the relationship between the resistance and the voltage applied between a slider and a support with respect to magnetic head devices manufactured by the first bonding method.
Figure 16:
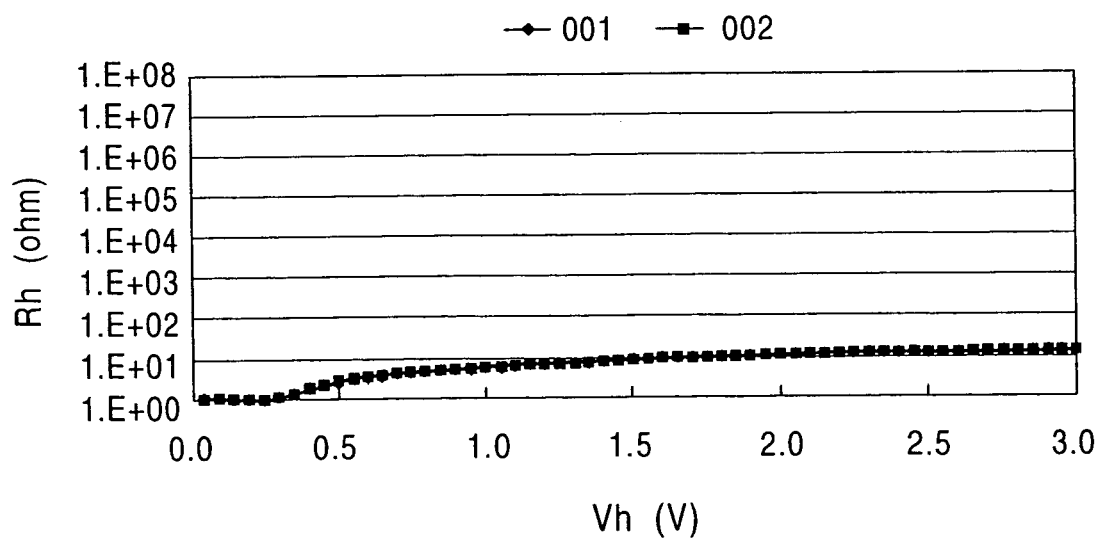
FIG. 16 is a graph showing the relationship between the resistance and the voltage applied between a slider and a support with respect to magnetic head devices manufactured by the second bonding method.
Figure 17:
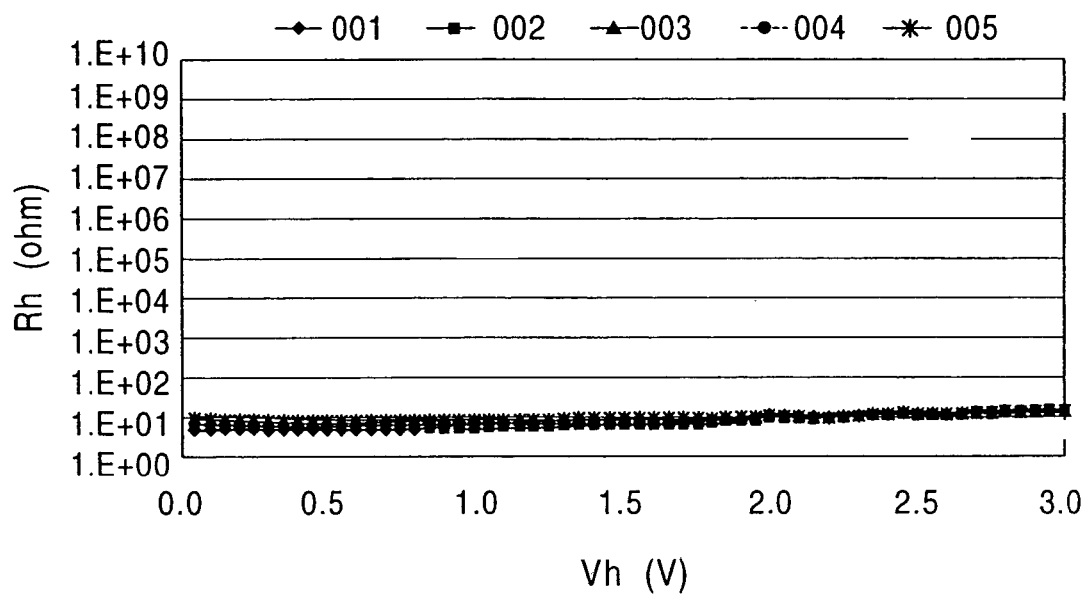
FIG. 17 is a graph showing the relationship between the resistance and the voltage applied between a slider and a support with respect to magnetic head devices manufactured by the third bonding method.
Figure 18:
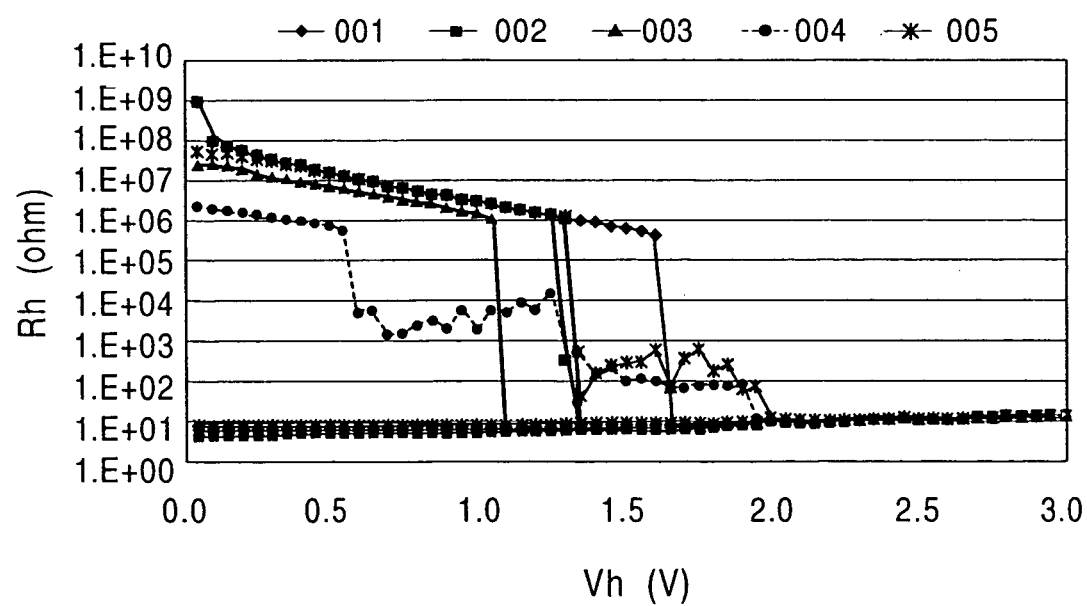
FIG. 18 is a graph showing the relationship between the resistance and the voltage applied between a slider and a support with respect to magnetic head devices manufactured without performing a step of causing dielectric breakdown.

FIG. 15 is a graph showing the relationship between the resistance and the voltage applied between a slider and a support with respect to each of two magnetic head devices in which the slider and the support are bonded to each other by the first bonding method described above (Example 1). FIG. 16 is a graph showing the relationship between the resistance and the voltage applied between a slider and a support with respect to each of two magnetic head devices in which the slider and the support are bonded to each other by the third bonding method (Example 2). FIG. 17 is a graph showing the relationship between the resistance and the voltage applied between a slider and a support with respect to each of five magnetic head devices in which the slider and the support are bonded to each other by the second bonding method (Example 3). FIG. 18 is a graph showing the relationship between the resistance and the voltage applied between a slider and a support with respect to each of five magnetic head devices in which a conductive resin is disposed between the tongue of the flexure and the slider and dielectric breakdown is not caused in the insulating layer lying under the conductive resin as in the conventional magnetic head device shown in FIGS. 9 and 10 (Comparative Example 1).

As is evident from Comparative Example 1 shown in FIG. 18, with respect to all of the five magnetic head devices, at a voltage of 0.5 V or less, the resistance is high at about $10^6$ Ω or more. As the voltage gradually increases, the resistance rapidly decreases at a certain voltage to 100 Ω or less in each magnetic head device.

In each magnetic head device, a shirt circuit does not occur between the conductive resin and the tongue at a low voltage of 0.5 V or less because of the insulating layer disposed between the conductive resin and the tongue, and a significantly high resistance is shown. However, as the voltage is gradually increased, at a certain point, a short circuit occurs between the conductive resin and the tongue, and a low resistance of 100 Ω or less is shown.

On the other hand, as is evident from Examples 1 to 3 shown in FIGS. 15 to 17, in each magnetic head device, the resistance is low at 100 Ω or less even at a voltage of 0.5 V or less. The reason for this is that dielectric breakdown is caused in the insulating layer lying between the conductive resin and the tongue, and thus a short-circuit state is produced. Even at a low voltage of 0.5 V or less, a low resistance of 100 Ω or less is obtained.

Figure 19:
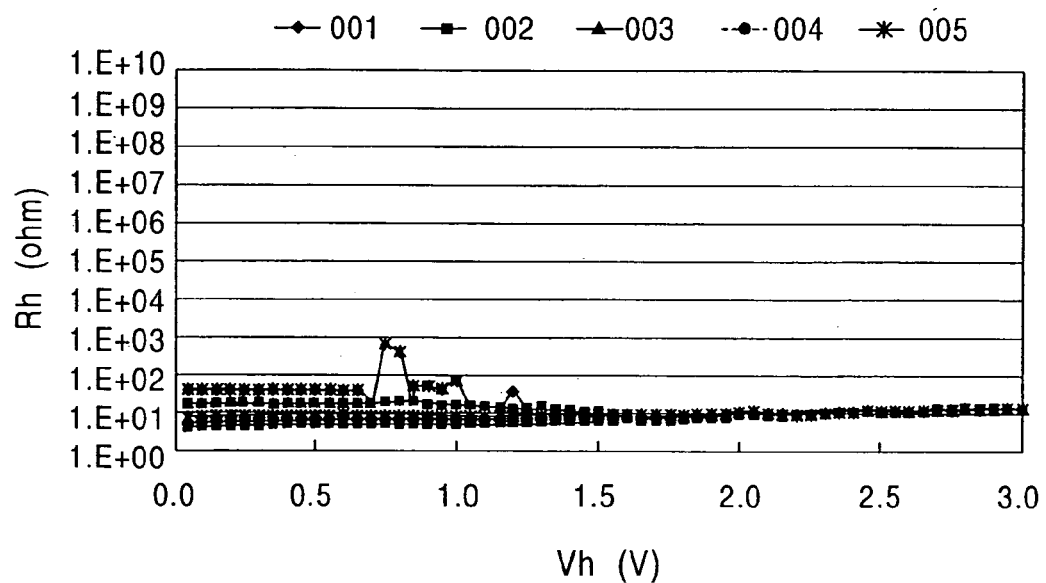
FIG. 19 is a graph showing the relationship between the resistance and the voltage applied between the slider and the support with respect to the magnetic head devices manufactured by the second bonding method which have been further subjected to a cleaning step.
Figure 20:
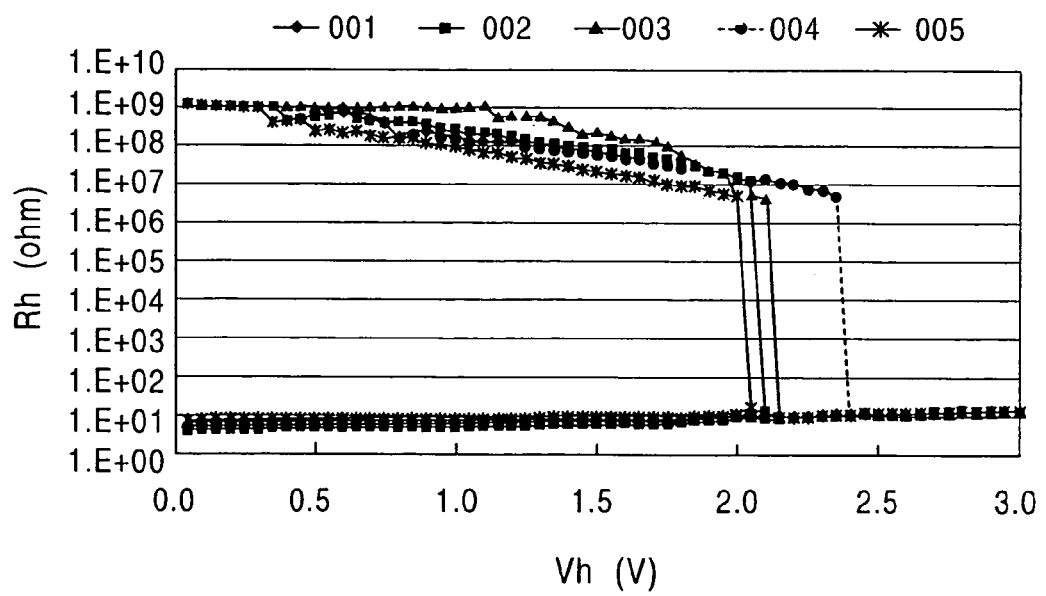
FIG. 20 is a graph showing the relationship between the resistance and the voltage applied between the slider and the support with respect to the magnetic head devices used in the experiment shown in FIG. 18 which have been further subjected to a cleaning step.
Figure 21:
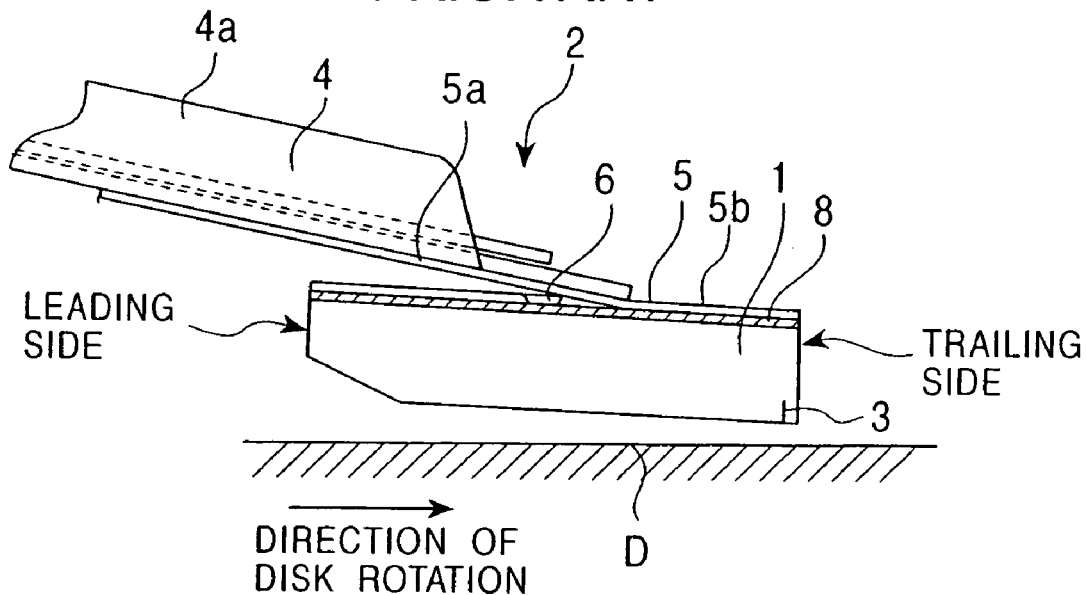
FIG. 21 is a partial side view of a conventional magnetic head device.
Figure 22:
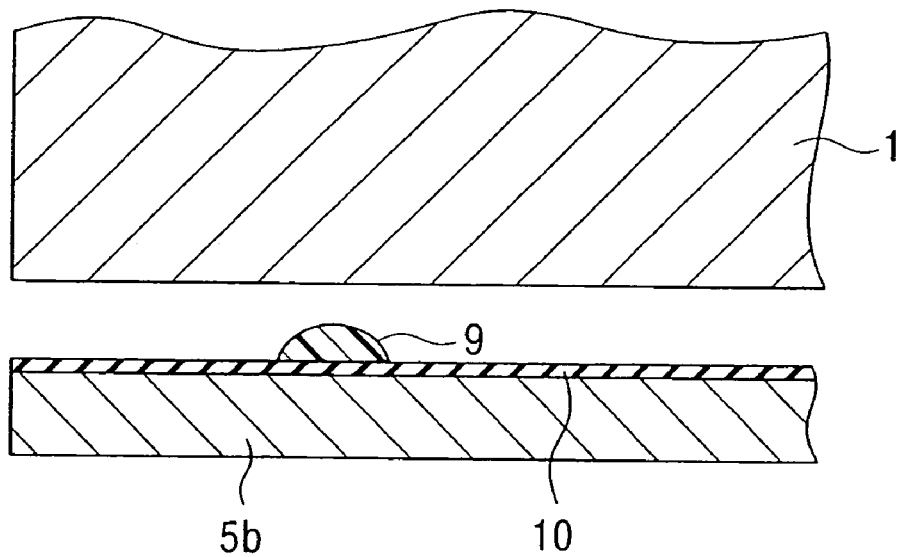
FIG. 22 is a partially enlarged sectional view showing a conventional bonding method between a slider and a tongue of a flexure.

FIG. 19 is a graph showing the relationship between the resistance and the voltage applied between the slider and the support with respect to each of the five magnetic head devices used in the experiment shown in FIG. 17, the magnetic head device having been further subjected to a cleaning step (Example 4). FIG. 20 is a graph showing the relationship between the resistance and voltage applied between the slider and the support with respect to each of the five magnetic head devices used in the experiment shown in FIG. 18, the magnetic head device having been further subjected to a cleaning step (Comparative Example 2).

As is evident from Comparative Example 2 shown in FIG. 20, with respect to each magnetic head device which has been cleaned, the resistance does not decrease to about 100 Ω or less until the voltage increases to about 1.5 V. On the other hand, as is evident from Example 4 shown in FIG. 19, with respect to the magnetic head devices which have been cleaned, although some samples show a slightly higher resistance than that shown in FIG. 17, substantially all the magnetic head devices have a low resistance of 100 Ω or less.

As is obvious from the experimental results, if dielectric breakdown is caused in the insulating layer lying under the conductive resin, even at a low voltage (specifically 0.5 V or less), an extremely low resistance (specifically 100 Ω or less) can be obtained. Consequently, during the actual use, in the magnetic head devices in Examples 1 to 4, even if an electrical potential difference occurs between the slider and the recoding medium, charges can be effectively dissipated from the slider through the conductive resin toward the support, and it is possible to effectively prevent electrostatic discharge from occurring in the thin-film element.

What is claimed is:

1. A magnetic head device comprising:
   a slider including a thin-film element for writing and/or reading; and
   a support for supporting the slider, the slider being bonded to a joint surface of the support at least partially with a conductive resin,
   wherein an insulating layer is disposed on the joint surface of the support, the insulating layer having at least a region in which dielectric breakdown is caused, and the conductive resin is disposed on the region.

2. The magnetic head device according to claim 1, wherein the conductive resin comprises a resin and a conductive filler mixed with the resin, and dielectric breakdown is caused between conductive filler particles.

3. The magnetic head device according to claim 1, wherein the resistance between the slider and the support is 100 Ω or less when a voltage of 0.5 V or less is applied.

* * * * *